(12) United States Patent
Hummel et al.

(10) Patent No.: US 10,948,117 B2
(45) Date of Patent: Mar. 16, 2021

(54) COUPLING SYSTEM FOR PROVIDING A PLURALITY OF FLUID CONNECTIONS

(71) Applicant: Airbus Operations GmbH, Hamburg (DE)

(72) Inventors: Gerhard Hummel, Hamburg (DE); Sten Scheffer, Hamburg (DE); Julian Weber, Hamburg (DE); Uwe Gareis, Hamburg (DE)

(73) Assignee: Airbus Operations GmbH

( * ) Notice: Subject to any disclaimer, the term of this patent is extended or adjusted under 35 U.S.C. 154(b) by 106 days.

(21) Appl. No.: 16/176,487

(22) Filed: Oct. 31, 2018

(65) Prior Publication Data

US 2019/0162347 A1    May 30, 2019

(30) Foreign Application Priority Data

Nov. 27, 2017  (DE) .................... 10 2017 128 022.7

(51) Int. Cl.
| | | |
|---|---|---|
| *F16L 37/32* | (2006.01) | |
| *F16L 37/34* | (2006.01) | |
| *F16L 37/56* | (2006.01) | |
| *F16L 29/04* | (2006.01) | |

(52) U.S. Cl.
CPC .............. *F16L 37/32* (2013.01); *F16L 37/34* (2013.01); *F16L 37/56* (2013.01); *F16L 29/04* (2013.01)

(58) Field of Classification Search
CPC . F16L 37/32; F16L 37/34; F16L 37/56; F16L 29/04; Y10T 137/87949
USPC ..................................................... 251/149.6
See application file for complete search history.

(56) References Cited

U.S. PATENT DOCUMENTS

| | | | | |
|---|---|---|---|---|
| 2,538,259 A | * | 1/1951 | Merriman ................ | F16L 37/34 137/351 |
| 2,628,850 A | * | 2/1953 | Summerville .......... | F16L 37/42 251/149.7 |
| 3,039,794 A | * | 6/1962 | De Cenzo ........... | F16L 37/1215 137/614.03 |
| 3,613,726 A | * | 10/1971 | Torres ..................... | F16L 37/23 137/614.03 |
| 3,779,584 A | * | 12/1973 | Ignatjev .................. | F16L 37/56 285/124.5 |
| 4,886,301 A | * | 12/1989 | Remsburg ............... | F16L 37/34 285/39 |
| 5,082,245 A | * | 1/1992 | Kast ..................... | F15B 20/005 137/327 |
| 5,215,122 A | * | 6/1993 | Rogers .................... | F16L 29/04 137/614.04 |
| 5,322,330 A | | 6/1994 | Remsburg | |

(Continued)

FOREIGN PATENT DOCUMENTS

| | | |
|---|---|---|
| DE | 199 20 291 A1 | 11/2000 |
| EP | 2 383 070 A1 | 11/2011 |
| WO | 2012/066728 A1 | 5/2012 |

*Primary Examiner* — David Colon-Morales
(74) *Attorney, Agent, or Firm* — Lerner, David, Littenberg, Krumholz & Mentlik, LLP (57) ABSTRACT

A coupling system has two coupling halves, each having a main body and a closure device arranged therein. The coupling halves can be pressed onto one another in order to release the closure devices and establish a fluid connection. By virtue of the configuration of the seals and of the closure devices, only a coarse tolerance is required for placing the coupling halves on one another.

10 Claims, 5 Drawing Sheets

(56) References Cited

U.S. PATENT DOCUMENTS

| | | | | |
|---|---|---|---|---|
| 5,398,723 A * | 3/1995 | Allread | ............ | F16L 37/34 |
| | | | | 137/614.03 |
| 5,464,042 A | 11/1995 | Haunhorst | | |
| 6,371,443 B1 * | 4/2002 | Imai | ............ | F16L 37/23 |
| | | | | 137/614.04 |
| 9,879,811 B2 * | 1/2018 | Gennasio | ............ | F16L 37/34 |
| 2009/0051161 A1 * | 2/2009 | Ekstrom | ............ | F16L 37/32 |
| | | | | 285/29 |
| 2011/0241331 A1 * | 10/2011 | Arisato | ............ | B23Q 1/0018 |
| | | | | 285/18 |
| 2018/0328526 A1 * | 11/2018 | Laufer | ............ | F16L 37/23 |

* cited by examiner

COUPLING SYSTEM FOR PROVIDING A PLURALITY OF FLUID CONNECTIONS

FIELD OF THE INVENTION

The invention relates to a coupling system for providing a plurality of fluid connections and to a vehicle which has a plurality of fluid lines and at least one coupling system of this kind.

BACKGROUND OF THE INVENTION

Hydraulic quick-acting couplings for providing and interrupting fluid connections have been known for a long time and are used in a very wide variety of stationary and mobile machines. To provide rapid connection between a plurality of hydraulic components or complete systems, it is possible to use "multi-couplings", by means of which a relatively large number of fluid and electric lines can be connected and disconnected simultaneously and repeatedly in a reliable and rapid manner. By means of a fixed arrangement of individual elements of a quick-acting coupling on a carrier plate, it is possible to eliminate confusion when connecting. Multi-couplings fundamentally comprise two coupling halves, one of which is connected in a fixed manner to a structure in order to form or accept a coupling socket and the other is embodied as a loose half in order to accept or form a coupling spigot.

To guide axial coupling spigots into the corresponding coupling sockets, very accurate tolerances have to be maintained in the case of conventional principles, especially in the case of multi-couplings with three or more pairs of coupling spigots and coupling sockets. This is observable particularly in the case of multi-couplings in which both coupling halves are integrated into respective components for financial or technical reasons. Owing to the precise tolerances, joining the coupling halves together can lead to tilting and hence to more difficult assembly.

BRIEF SUMMARY OF THE INVENTION

Consequently, there may be a requirement to use a coupling system which is as free of tolerances as possible to connect a plurality of fluid lines and which leads to significant savings in respect of component costs to be expected and to the reduction of production and installation effort.

A coupling system for providing a plurality of fluid connections is proposed, the coupling system having a first main body, a second main body, a plurality of first connectors, which are arranged on the first main body, and a plurality of second connectors, which are arranged at positions on the second main body which correspond to the first connectors in order to form connector pairs. Each first connector has a first axial sealing sleeve and a first closure device surrounded by said sleeve, which can be moved relative to one another in an axial direction between a first open position and a first closed position and are urged into the first closed position by a first spring. Each second connector has a second axial sealing sleeve and a second closure device surrounded by said sleeve, which can be moved relative to one another in an axial direction between a second open position and a second closed position and are urged into the second closed position by a second spring. The first axial sealing sleeve and the second axial sealing sleeve each have an end-located boundary surface and a fluid port remote from said surface. The first connector and the second connector are designed to bring about sealing between the axial sealing sleeves and to move the first closure device and the second closure device from the respective closed position into the respective open position, in which a fluid connection is established between the respective end-located boundary surface and the respective fluid port, when there is mechanical pressure between the end-located boundary surfaces.

Consequently, the coupling system essentially has two main components in the form of a first coupling half and a second coupling half. The first coupling half principally has the first main body and a number of first connectors. Similarly, the second coupling half has the second main body and likewise has a number of second connectors, the size, embodiment and position of which are matched to the first connectors on the first main body. In this arrangement, the number, size and position of the connectors are dependent, in particular, on the number of fluid lines to be connected, the intended use, the type of fluid and the system pressure and can be adapted as desired without departing from the core concept of the invention.

The first connectors and the second connectors are embodied in such a way that they produce adequate sealing to connect the interior spaces of the axial sealing sleeves without leaks by one end-located boundary surface being pressed or placed on the other end-located boundary surface. In addition, a fluid connection between a fluid port and an interior space of the axial sealing sleeve is provided in both connectors. By means of the closure devices, these two fluid connections are interrupted when the first and the second connector are separated from one another. If there is an increased pressure at the respective connectors, this additionally increases the sealing effect since the respective closure device is pressed into its sealing seat.

This means that the two coupling halves in the form of the first main body with first connectors and of the second main body with second connectors must be pressed onto one another in order to open the closure devices of the first and the second connector, i.e. to bring them into their respective open position. In this position in which they are pressed onto one another, the two main bodies can be fixed relative to one another to ensure a permanent fluid connection between the first fluid port and the second fluid port.

One particularly great advantage of this embodiment is that both closure devices of two connectors to be connected to one another are surrounded by an axial sealing sleeve, the mutually facing end-located boundary surfaces of which can be brought into sealing surface contact. The required tolerance of the dimensions of the axial sealing sleeves and of the end-located boundary surfaces is significantly coarser than in the case of known coupling systems, which rely on guide pins and individual radial seals, which must be fitted accurately into corresponding holes. In establishing a connection between two abovementioned connectors, it is sufficient for a sealing element arranged on one of the end-located boundary surfaces to be brought into full contact with both boundary surfaces, for example. Depending on the size of the axial sealing sleeves and of the boundary surfaces, the relative position of the connectors can differ significantly from a concentric alignment.

In selecting the spring stiffnesses, it should be noted that the spring which is arranged in the connector that is connected to a pressurized fluid should have a higher spring stiffness. This can be the second connector, for example, which is in fluid communication with a pressure line.

An axial sealing sleeve can be understood as a body which is open at at least one end, which encloses a cavity and which has a closed shell that ends in the boundary surface.

An axial sealing sleeve can be cylindrical in shape, at least in some region or regions, for example, with the result that the end-located boundary surface is a ring. A closure device arranged in the axial sealing sleeve is furthermore responsible for the fluid connection between a region of an interior space of the axial sealing sleeve which is adjacent to the boundary surface and a side remote from the boundary surface, at which the fluid connection is arranged. The specific detailed configuration of the closure device can depend on the configuration of the axial sealing sleeve and on the desired mobility of the axial sealing sleeve or of the closure device. The aim is, when joining the two end-located boundary surfaces, to initiate a movement of both closure devices relative to the axial sealing sleeve, whether by moving the axial sealing sleeve or the relevant closure device, thus ensuring that both closure devices are in the open position thereof when the end-located boundary surfaces are in flush surface contact.

In an advantageous embodiment, the first axial sealing sleeve is arranged rigidly on the first main body and, in an interior space, has a through flow opening surrounded by an edge surface. The first closure device has an axially guided first closure disc, which is arranged on a side of the edge surface which faces away from the end-located boundary surface. A first spring is arranged between the first closure disc and an end surface remote from the end-located boundary surface and is designed to press the first closure disc onto the edge surface. The rigidly arranged axial sealing sleeve can consequently be pressed onto the second axial sealing sleeve in order to enter into a sealing joint. In this process, a deflection of the first closure disc has to be carried out, the closure disc being pressed onto the edge surface. It is possible, for instance, for the first closure disc to have a pin, a body which is elongate, at least in some region or regions, or any other desired body which extends in an axial direction from the first closure disc towards the end-located boundary surface. By pressing the first axial sealing sleeve onto the second axial sealing sleeve, it is possible for this pin or other body to be brought into stop contact with another corresponding body of matching shape on a second connector, thereby exerting a pressure force on the first closure disc and hence the first spring. The first closure device should be dimensioned in such a way that, when the sealing joint between the end-located boundary surfaces has been achieved, the first closure disc is at a sufficiently large distance from the edge surface to allow substantially unhindered through flow of the fluid. When the first connector is released from the second connector again, the force acting on the first closure disc is eliminated, with the result that the first closure disc rests once again on the edge surface. The first connector is thus closed again.

For sealing between the first closure disc and the first edge surface, a sealing ring is arranged between the first closure disc and the edge surface.

In an advantageous embodiment, the first axial sealing sleeve has an axial guide bush, in which a first guide pin connected to the first closure disc is movably mounted, said pin extending from the first closure disc in a direction away from the first end-located boundary opening. The axial guide bush can extend along the longitudinal axis of the first connector, for example, and can thus be arranged concentrically with other devices of the first connector. It is conceivable for the at least one first through flow opening to be embodied as a multiplicity of smaller openings, which are arranged around the guide bush. By means of axial guidance of the first closure disc in the guide bush, precise alignment of the first closure disc can be achieved, this being completely independent of external conditions. The end-located boundary surfaces of the first connector and of the second connector could differ significantly from a concentric arrangement, for example, without this having effects on the positioning of the first closure disc. The arrangement of a guide bush and the use of a guide pin are mechanically particularly simple and can be adapted in any desired manner, e.g. by varying the length of the guide bush and the diameter and length of the guide pin.

In an advantageous embodiment, the first axial sealing sleeve has a disc-shaped shoulder, in which a plurality of first through flow openings is arranged between the axial guide bush and the edge surface. The effective flow cross section of the at least one first through flow opening can be influenced directly by the choice of the number of through flow openings between the edge surface and the axial guide bush. It is conceivable for a plurality of first through flow openings to be distributed uniformly or non-uniformly on an annular path around the guide bush. The disc-shaped shoulder can be understood as a disc which is situated in the interior of the first axial sealing sleeve.

The first guide pin can have a rounded end facing away from the first main body. It is thereby possible to precisely define the contact area with a corresponding element of the second connector. In this case, the contact area should, in particular, be provided centrally, thus avoiding one-sided introduction of force into the first guide pin and hence a risk of tilting.

In an advantageous embodiment, the second closure device has a recess, which faces away from the second main body and is designed to establish surface contact with the first guide pin. Through the production of the recess, which has a surface surrounded by an edge, the location of surface contact between the first guide pin and the second closure device is likewise precisely defined. Given appropriate configuration of the edge, it is furthermore possible to ascertain visually and haptically when the first connector and the second connector deviate greatly from a concentric arrangement. In this case, the first guide pin can rest on the edge and can prevent complete pressing together of the connectors. There would then remain a gap owing to the jamming first guide pin.

In an advantageous embodiment, the second axial sealing sleeve is arranged in an axially movable manner on the second main body and has a second through flow opening surrounded by a second edge surface on the second end surface. The second closure device has a second closure disc, which is rigidly connected to the second main body and is arranged on a side of the second edge surface which faces away from the second main body, and wherein a second spring is arranged between the second axial sealing sleeve and the second main body and is designed to press the second edge surface onto the second closure disc. This embodiment of the second connector or second coupling half is kinematically reversed in relation to the above-explained embodiment of the first coupling half or first connector. Consequently, the second axial sealing sleeve is pushed continuously away from the second main body by the second spring. The second closure disc, which is rigidly connected to the second main body, can limit the movement of the second axial sealing sleeve and simultaneously bring about closure of the second connector by covering the second edge surface. If, therefore, the second connector is brought into contact with a first connector, the second axial sealing sleeve is deflected towards the second main body against the spring force, thus opening a through flow opening at the second axial sealing sleeve in the case of the rigidly mounted second closure disc. In this embodiment, care should be taken to ensure that the second axial sealing sleeve has sufficient space to enter against the spring force. For this purpose, the main body can have a correspondingly shaped recess, for example.

A sealing ring can furthermore be arranged between the second closure disc and the second edge surface in order to achieve a seal between the second closure disc and the second axial sealing sleeve.

The second axial sealing sleeve can furthermore be mounted movably in a guide sleeve, wherein the guide sleeve is rigidly connected to the second main body. The guide sleeve can have a larger diameter than the second axial sealing sleeve. A radial seal, by means of which sealing between the two sleeves is achieved, can be arranged between the two sleeves. A minimum possible friction coefficient is desirable when selecting the radial seal, and it is generally possible to achieve this with radial sealing rings, i.e. lip seals, X rings or the like.

Furthermore, the guide sleeve, as indicated above, can have a depression, which is designed to accommodate the second closure disc in a position deflected towards the second main body. It is thereby possible to make the coupling system even more compact and to hold the second closure disc reliably in the predetermined position when the two connectors are in a connected state.

The above-mentioned recess, by means of which surface contact with the first guide pin can be established, is arranged on a side of the second closure disc facing away from the second main body.

Furthermore, the end-located boundary surfaces of the first connector and of the second connector can each be arranged in an annular connecting flange, wherein the connecting flanges of the first connector and of the second connector are shaped to correspond to one another. This enables the two connectors to be clamped to one another via the connecting flanges with the aid of screw fastening means or the like.

The invention furthermore relates to a vehicle having a plurality of fluid lines and at least one system in accordance with the above description, which is connected to the fluid lines.

As a particular preference, the vehicle is an aircraft. Many different fluid systems and loads can be connected reliably and safely here by means of a coupling system, while, at the same time, assembly times are reduced.

BRIEF DESCRIPTION OF THE DRAWINGS

Further features, advantages and possible uses of the present invention will be found in the following description of the embodiment examples and the figures. In this context, all the features described and/or depicted, either in themselves or in any combination, form the subject of the invention, irrespective of the way they are combined in the individual claims or dependency references thereof. In the figures, the same reference signs furthermore stand for identical or similar objects.

DETAILED DESCRIPTION

FIGS. 1A to 1D show the basic principle of a coupling system 2 according to an embodiment of the invention in schematic views. The coupling system 2 has a first main body 4, on which a first connector 6 is arranged. The first main body 4 is indicated only by a small, flat element. However, this first main body 4 can be, in particular, a housing surface or the like, on which a multiplicity of first connectors 6 is arranged and which extends over a significantly larger area than shown here.

Figure 1A:
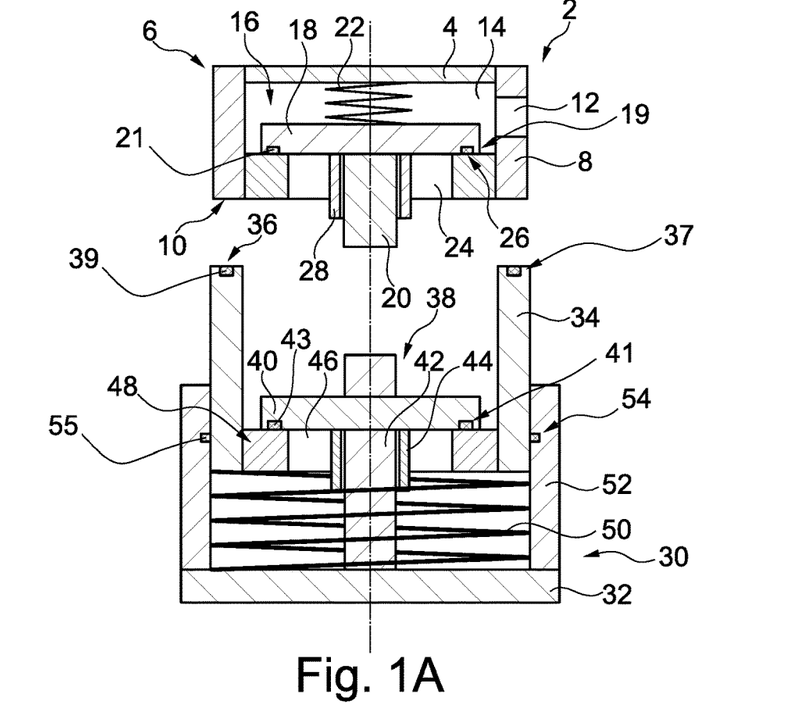
FIGS. 1A to 1D show a coupling system in several schematic views and states.

The first connector has a first axial sealing sleeve 8, which extends outwards from the first main body 4. The first axial sealing sleeve 8 has an end-located first boundary surface 10, which is arranged on a side of the first axial sealing sleeve 8 which faces away from the first main body 4. There is a first fluid port 12 on a side of the first axial sealing sleeve 8 remote from the first end-located boundary surface 10, said port extending radially outwards by way of example. The first fluid port 12 is in fluid communication with an interior space 14 of the first axial sealing sleeve 8.

Also arranged in the interior space 14 is a first closure device 16, which has a first closure disc 18, a first guide pin 20, a first spring 22, a plurality of first through flow openings 24 and a first edge surface 26. The first closure disc 18 is pressed onto the edge surface 26 by the first spring 22 and is guided in a first bush 28 by the first guide pin 20. The first spring 22 acts in the direction of the first end-located boundary surface 10, wherein the first edge surface 26 faces away from the first end-located boundary surface 10. This means that the first through flow openings 24 are closed when the first closure disc 18 is in flush surface contact with the first edge surface 26. To seal the first closure disc 18 at the first edge surface 26, an encircling groove 19, in which a sealing ring 21 rests, is arranged on the first closure disc 18, by way of example. However, the groove 19 and the sealing ring 21 could also be arranged in the first edge surface 26. Pressing the guide pin 20 towards the first spring 22 opens the first closure device 16, and a fluid connection is formed between the first through flow openings 24 and the first fluid port 12.

The coupling system 2 furthermore has a second connector 30, which is arranged on a second main body 32. Here too, it is understandable that the second main body 32 is likewise only indicated and can extend over a significantly larger area than shown here. Furthermore, the number of second connectors 30 should be correlated with the number of first connectors 6. Moreover, the positions of the first connectors 6 and of the second connectors 30 should be matched to the respective main bodies 4 and 32.

The second connector 30 has a movably mounted second axial sealing sleeve 34, which has a second end-located boundary surface 36. Arranged therein is an encircling groove 37 with a sealing ring 39, which can establish sealing surface contact with the first boundary surface 10 of the first axial sealing sleeve 8. The groove 37 and the sealing ring 39 could also be arranged in the first boundary surface 10. A second closure device 38 has a second closure disc 40 and a second guide pin 42. A second guide bush 44 connected to the second axial sealing sleeve 34 surrounds the second guide pin 42 in a flush-fitting manner. In addition, there are second through flow openings 46, which are covered by the second closure disc 40 when the second closure disc 40 is in surface contact with a second edge surface 48. The second axial sealing sleeve 34 is pushed away from the second main body 32 by a second spring 50, with the result that the second edge surface 48 is pressed onto the second closure disc 40. For sealing, the second closure disc 40 has, by way of example, an encircling groove 41 with a sealing ring 43 integrated therein. The groove 41 and the sealing ring 43 can furthermore also be arranged in the edge surface 48. When the second closure disc 40 is in surface contact with the second edge surface 48, the sealing ring 43 is pressed into flush-fitting contact with the edge surface 48.

A second fluid port (not shown here) can, for example, be present directly in the second main body 32, on which the second spring 50 is supported. Furthermore, a rigid bearing sleeve 52 connected to the second main body 32 is provided, said sleeve having a radial seal in the form of a sealing ring 55 in an encircling groove 54 to establish a seal for a connection to the second axial sealing sleeve 34. However, the groove 54 and the sealing ring 55 could also be arranged in the second axial sealing sleeve. The bearing sleeve 52 does not necessarily have to be a separate component but can also be implemented as a depression in the second main body 32.

In this example, the second axial sealing sleeve 34 is arranged on an inner side of the bearing sleeve 52, and the radial seal 54 is in the form of a sealing ring in a corresponding sealing seat. The second guide pin 42 is mounted rigidly on the second main body 32. By means of the second guide bush 44, the second axial sealing sleeve 34 can be moved in a guided manner along the longitudinal axis. In this arrangement, the second closure device 38 is opened as soon as the second end-located boundary surface 36 is moved towards the second main body 32 and, consequently, the second through flow openings 46 are exposed. In the following FIGS. 1B to 1D, the establishment of a connection between the first connector 6 and the second connector 30 is illustrated.

Figure 1B:
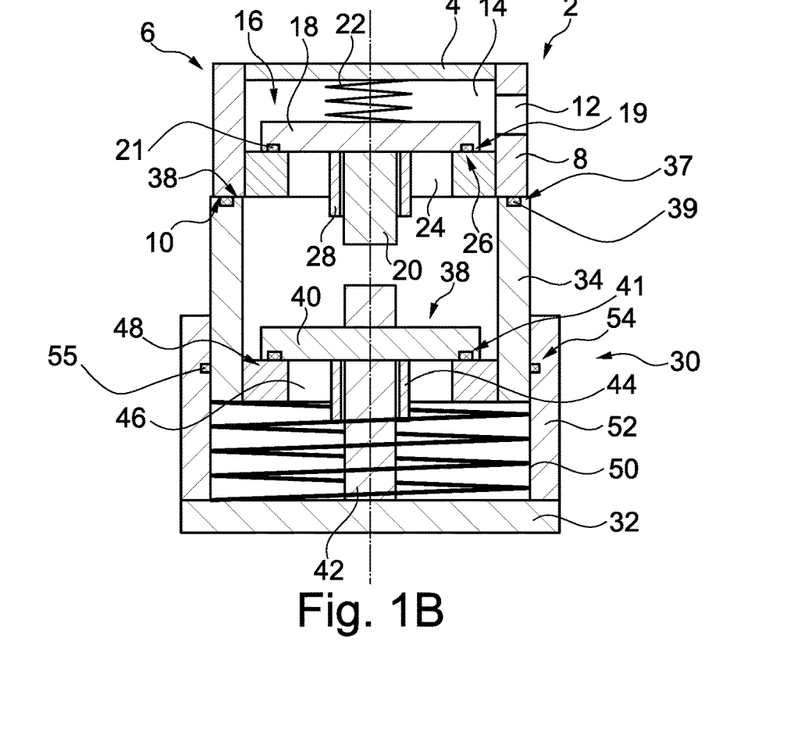

In FIG. 1B, the first connector 6 is placed on the second connector 30. The two end-located boundary surfaces 10 and 36 are consequently in surface contact and press on the sealing ring 39 on both sides. The first closure device 16 and the second closure device 38 each press onto the associated sealing ring 21 and 43 and are thereby closed, with the result that there is no fluid communication between the first fluid port 12 and the second fluid port (not shown). In this illustration, it can be seen that precise alignment of the first boundary surface 10 on the second boundary surface 36 is not absolutely essential. By means of appropriate dimensioning of these boundary surfaces 10 and 36, a safe and reliable fluid connection can be established, even when the connectors 6 and 30 are positioned in a relatively inaccurate way relative to one another, as shown in the following figures.

Figure 1C:
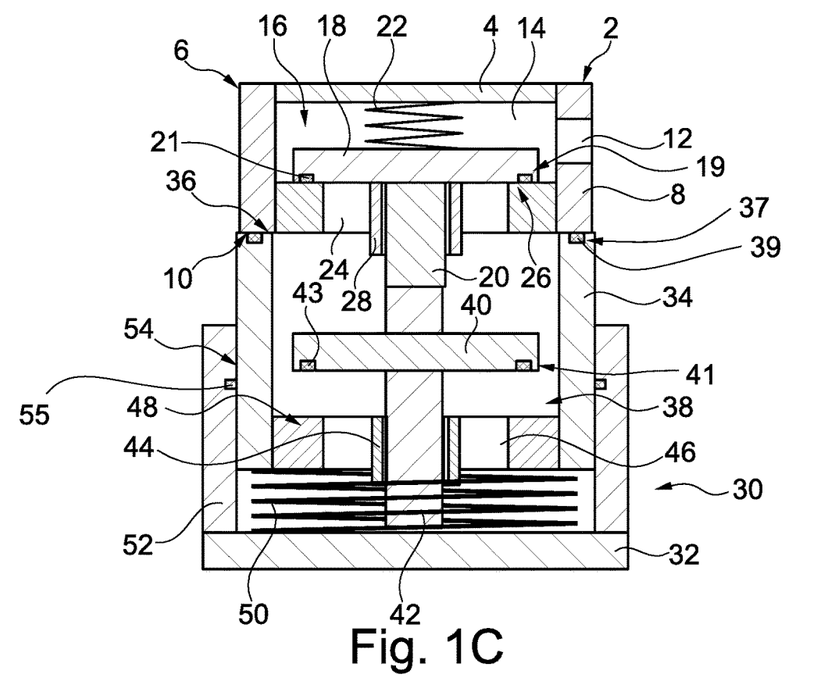

In FIG. 1C, it can be seen that, when there is surface contact between the boundary surfaces 10 and 36, a pressure force is exerted on the connectors 6 and 30, with the result that the second spring 50 is compressed. As a result, the first guide pin 20 and the second guide pin 42 likewise enter into surface contact. In the position shown in FIG. 1C, the second edge surface 48 has come away from the second closure disc 40, with the result that a fluid connection is established between the through flow openings 46 and an opening bounded by the second end-located boundary surface 36. The first closure disc 18 is still resting on the first edge surface 26, and, as a result, the first closure device 16 is not yet closed.

Figure 1D:
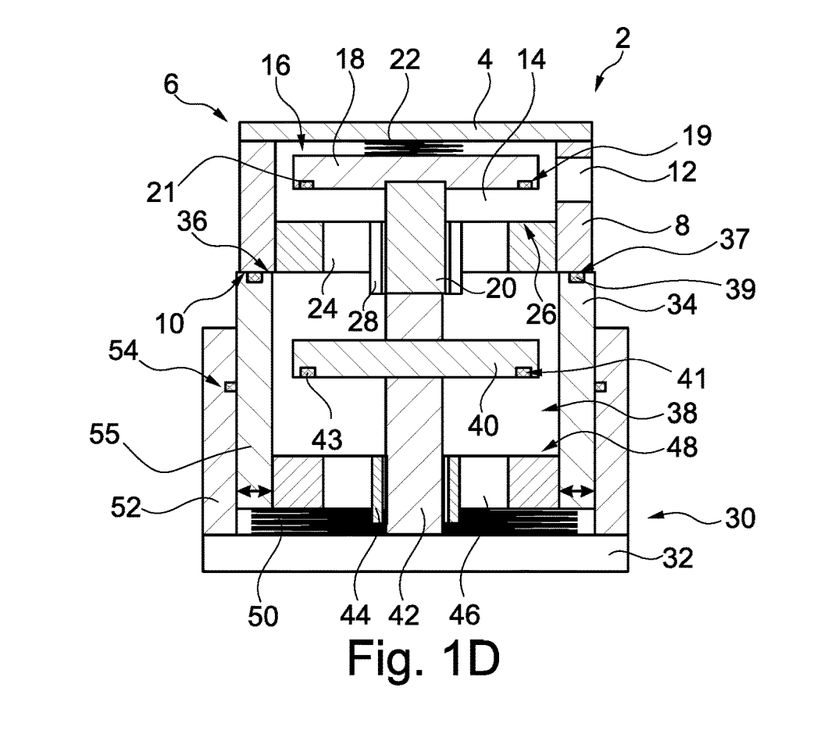

FIG. 1D shows a state in which an even greater pressure force is exerted on the two connectors 6 and 30, with the result that the first guide pin 20 is also moved in the first guide bush 28 against the spring force of the first spring 22. The first closure device 16 therefore likewise opens. Irrespective of precise alignment of the two connectors 6 and 30 relative to one another, a reliable fluid connection can thus be established. If there is a plurality of first and second connectors on flat main bodies 4 and 32, these can consequently be placed one on top of the other and then clamped together, with the result that the connectors 6 and 30 open. This position can then be held by screw fastening.

Figure 2A:
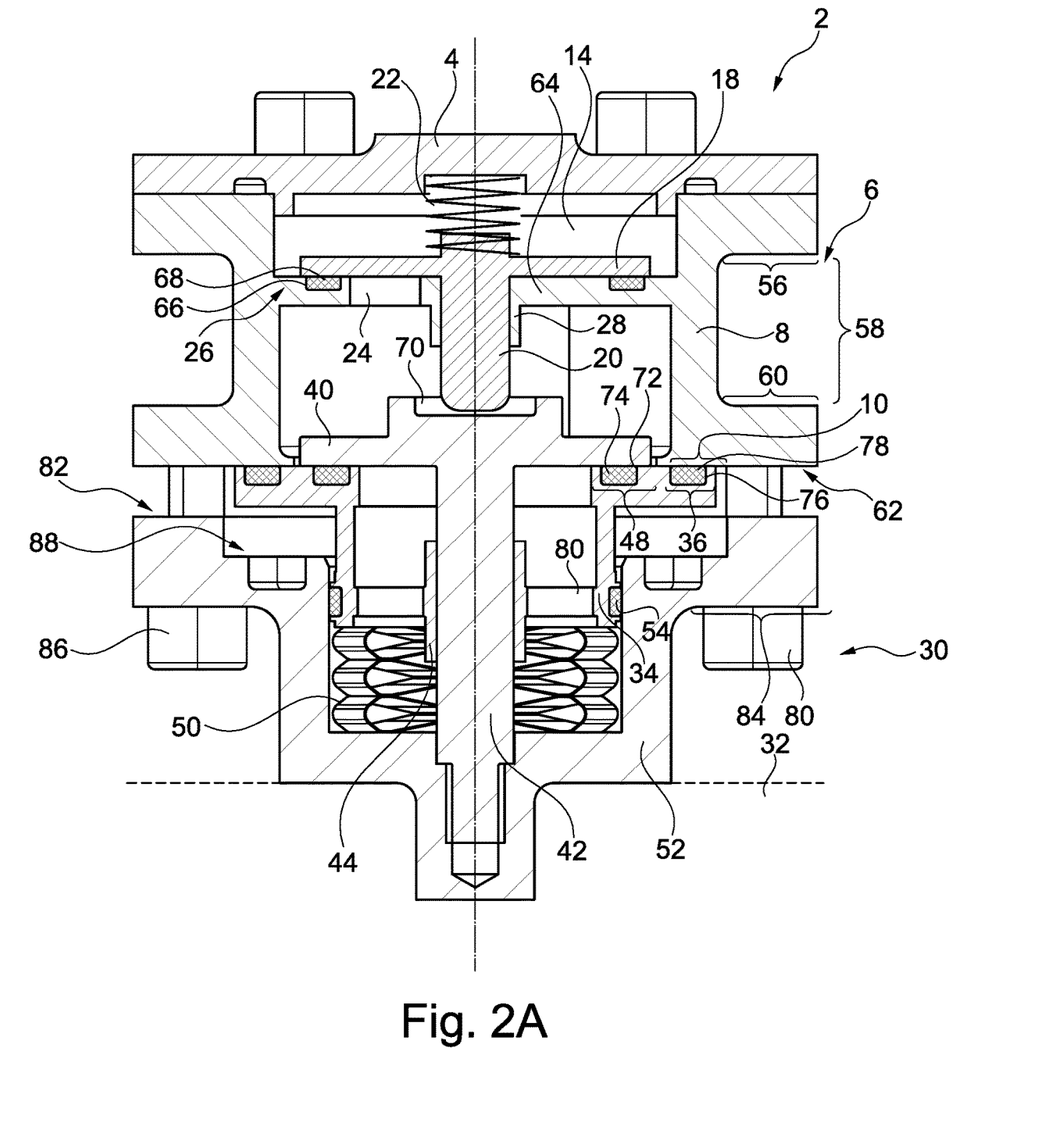
FIGS. 2A to 2C show the coupling system in the form of a possible embodiment example in several states.
Figure 2B:
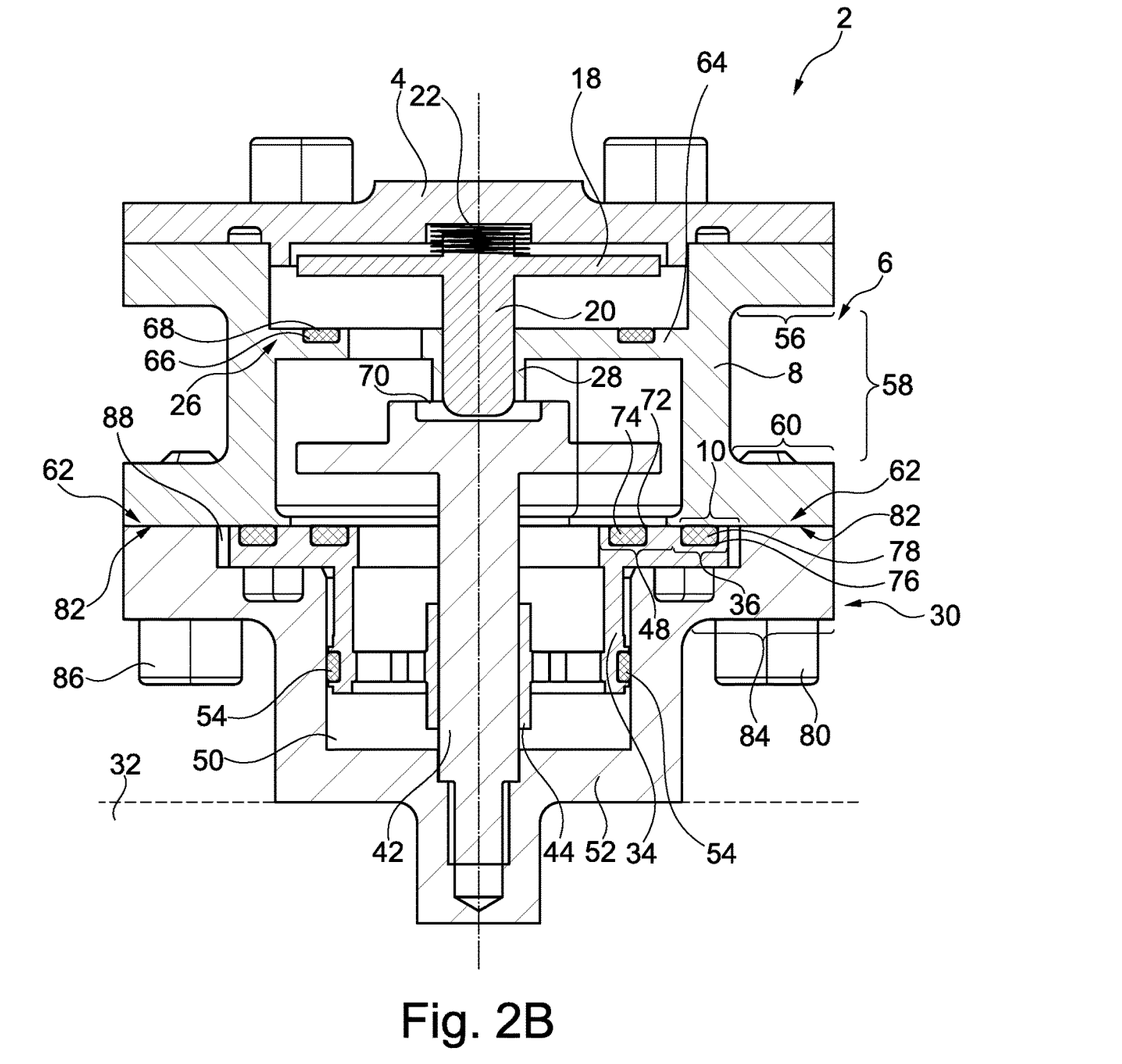
Figure 2C:
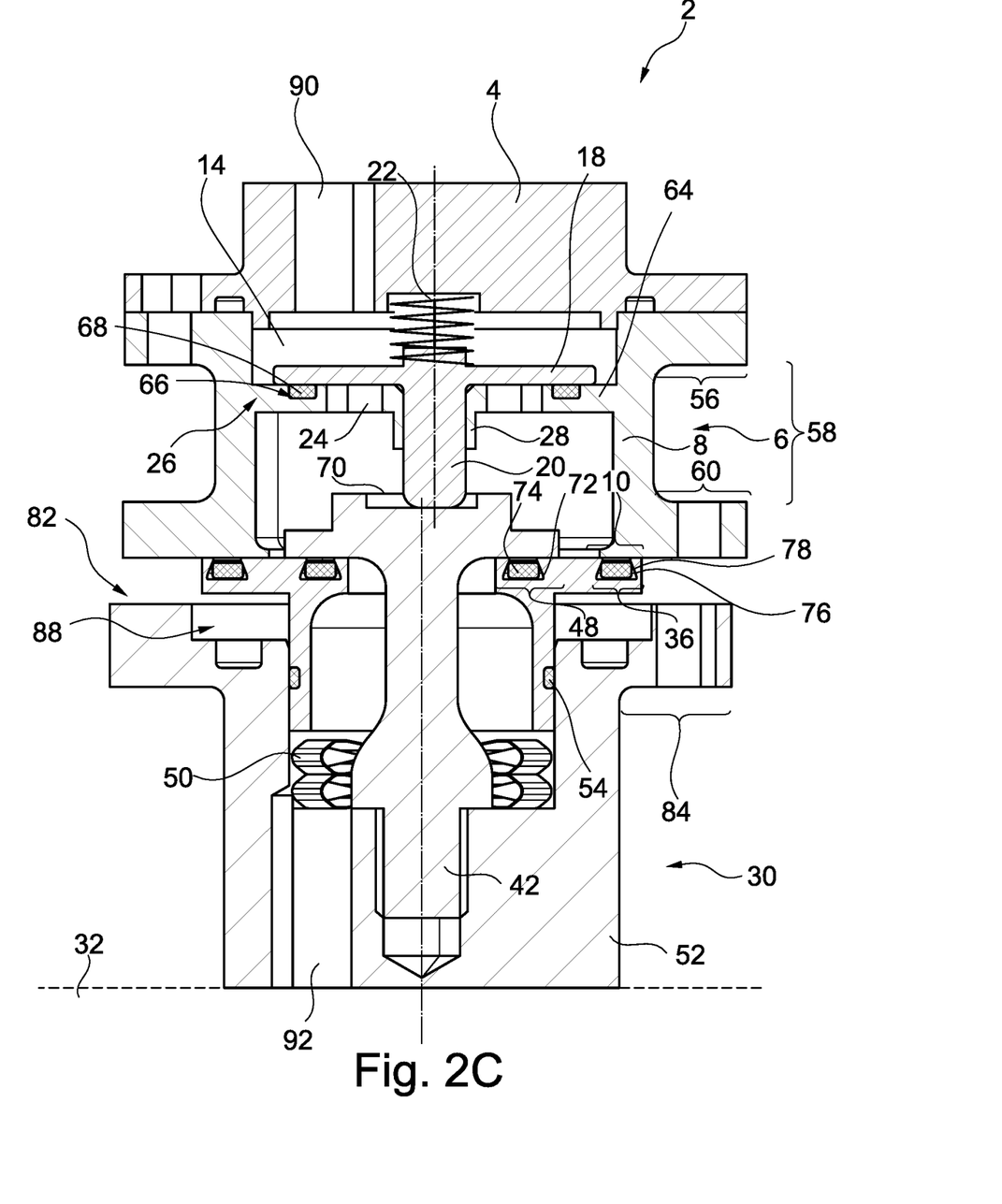

One possible specific configuration is illustrated in FIGS. 2A to 2C. FIG. 2A shows the coupling system 2 in a lateral section. The first connector 6 has a structure which corresponds substantially to the schematic illustration in the previous figures. However, the shape of the first axial sealing sleeve 8 is embodied in a manner appropriate to the loads and to assembly. A substantially annular bearing flange 56 is used for connection to the first main body 4 since this annular addition provides a relatively large supporting surface. Adjoining this annular bearing flange 56 in the axial direction is the substantially cylindrical portion 58, which ends in a likewise substantially annular first connecting flange 60. This flange provides the end-located boundary surface 10 on a side remote from the bearing flange 56. The annular addition in the form of the first connecting flange 60 provides a first supporting surface 62 radially further towards the outside, on which the second connector 30 rests when it is connected to the first connector 6.

In the interior of the first axial sealing sleeve 8 there is a kind of disc-shaped shoulder 64, which bears both the first guide bush 28 and the first through flow openings 24. An annular groove 66 with a sealing ring 68 located therein is arranged on a side of the shoulder 64 facing the first main body 4. The sealing ring 68 leads to leak-tight closure between the first closure disc 18 and the first through flow openings 24. At this point, it should be noted that, when the interior space 14 of the first connector 6 is subjected to pressure, the first closure disc 18 is pressed continuously onto the edge surface 26 and hence onto the sealing ring 68.

The first guide pin 20 is rounded at its end remote from the main body 4 in order to precisely limit the contact area, even when the connectors 6 and 30 are inaccurately positioned.

In FIGS. 2A to 2C, the second main body 32 is indicated only by a dashed line, and the second connector 30 is secured thereon by means of its guide sleeve 52. The second connector 30 can be screwed into the second main body 32 by means of an end at the bottom in the drawing, for instance. On a side facing away from the second main body 32, the second guide pin 42 of the second connector 30 has a recess 70, with which the first guide pin 20 comes into contact when the first connector 6 and the second connector 30 are joined together.

In FIG. 2A, the second closure disc 40 rests on the edge surface 48 of the second axial sealing sleeve 34. An encircling groove 72, which carries a sealing ring 74, is arranged in the edge surface 48. This leads to sealing of the second connector 34 with respect to the outside when the second connector 30 is not connected to the first connector 6. Furthermore, the second axial sealing sleeve 34 is provided with a shape such that the end-located boundary surface 36 adjoins the edge surface 48 radially on the outside. There too, a groove 76 can be arranged, in which a sealing ring 78 is placed. Sealing with the first axial sealing sleeve 8 can thereby be brought about.

The second guide pin 42 is connected in a fixed manner to the second main body 32 and guides the second axial sealing sleeve 34 via the second guide bush 44, which is mounted in a sliding manner on a stem of the second guide pin 42. The second spring 50 is arranged between a disc-shaped shoulder 80 and an end of the guide sleeve 52 facing the second main body 32 and urges the second axial sealing sleeve 34, via the disc-shaped shoulder 30, in the direction of the second closure disc 40 in order to close the second connector 30 as soon as it is not connected to the first connector 6. When the two connectors 6 and 30 are connected, the second closure disc 40 is deflected towards the second main body 32. For secure reception of the second closure disc 40, the guide sleeve 52 has a correspondingly shaped depression 88 on a side facing the first connector 6.

When the first connector 6 is connected to the second connector 30, the first supporting surface 62 comes to rest on a second supporting surface 82 of a second connecting flange 84. In this position, the first connecting flange 60 can be clamped to the second connecting flange 84, as indicated by the screw fastening means 86. In FIG. 2A, the first connector 6 and the second connector 30 are shown in a position placed one on top of the other in which no fluid connection between the two has yet been established.

In FIG. 2B, the state of the two interconnected connectors 6 and 30 is illustrated, which are clamped together by the screw fastening means 86. The depression 88 should preferably be dimensioned in such a way that the second axial sealing sleeve 34 is not clamped flush either with the first axial sealing sleeve 8 or with the guide sleeve 52, in order to avoid excessive mechanical surface pressure. On the contrary, the depression should allow reliable compression of the sealing ring 78 with the end-located boundary surface 10 for the sake of adequate sealing.

As can be seen in the illustration from FIG. 2C, the coupling system 2 is capable of tolerating significant deviations from a concentric arrangement of the first connector 6 and of the second connector 30 relative to one another. This illustration is shown from a different perspective and likewise contains a first fluid port 90 and a second fluid port 92. These are not illustrated in the other drawings and are only positioned in an illustrative way in FIG. 2C. Different embodiments of the first fluid port 90 and of the second fluid port 92 are also conceivable.

Different guidance of the second axial sealing sleeve 34 can also be seen in FIG. 2C. Here, this is not in an axial guide bush 44 but by means of a lateral surface in the guide sleeve 52, said lateral surface having the sealing ring 54.

As a supplementary point, it may be pointed out that "having" does not exclude any other elements or steps and "a" or "an" does not exclude a multiplicity. Furthermore, it should be noted that features which have been described with reference to one of the above embodiment examples can also be used in combination with other features of other embodiment examples described above. Reference signs in the claims should not be regarded as restrictive.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A coupling system for providing a plurality of fluid connections, comprising:
a first main body;
a second main body;
a plurality of first connectors arranged on the first main body; and
a plurality of second connectors arranged at positions on the second main body which correspond to the first connectors in order to form connector pairs,
wherein each first connector has a first axial sealing sleeve and a first closure device surrounded by said sleeve, the first axial sealing sleeve and the first closure device configured to be moved relative to one another in an axial direction between a first open position and a first closed position and to be urged into the first closed position by a first spring,
wherein each second connector has a second axial sealing sleeve and a second closure device surrounded by said sleeve, the second axial sealing sleeve and the second closure device configured to be moved relative to one another in an axial direction between a second open position and a second closed position and to be urged into the second closed position by a second spring,
wherein the first axial sealing sleeve and the second axial sealing sleeve each have an end-located boundary surface and a fluid port remote from said surface,
wherein the first connector and the second connector are configured to bring about sealing between the axial sealing sleeves and to move the first closure device and the second closure device from the respective closed position into the respective open position, in which a fluid connection is established between the respective end-located boundary surface and the respective fluid port, when there is mechanical pressure between the end-located boundary surfaces,
wherein the first axial sealing sleeve is arranged rigidly on the first main body and, in an interior space, has at least one first through flow opening surrounded by a first edge surface,
wherein the first closure device has an axially guided first closure disc arranged on a side of the first edge surface facing away from the end-located boundary surface,
wherein the first spring is arranged between the first closure disc and an end surface remote from the end-located boundary surface and is configured to press the first closure disc onto the first edge surface, and
wherein the first axial sealing sleeve has an axial guide bush, in which a first guide pin connected to the first closure disc is movably mounted, said first guide pin extending from the first closure disc in a direction towards the first end-located boundary surface.

2. The coupling system according to claim 1, wherein the first axial sealing sleeve has a disc-shaped shoulder, in which a plurality of first through flow openings is arranged between the axial guide bush and the first edge surface.

3. The coupling system according to claim 1, wherein the first guide pin has a rounded end facing away from the first main body.

4. The coupling system according to claim 1, wherein the second closure device has a recess facing away from the second main body and is configured to establish surface contact with the first guide pin.

5. The coupling system according to claim 4, wherein the second axial sealing sleeve is arranged in an axially movable manner on the second main body and has at least one second through flow opening surrounded by a second edge surface on the second end-located boundary surface, wherein the second closure device has a second closure disc rigidly connected to the second main body and arranged on a side of the second edge surface facing away from the second main body, wherein the second spring is arranged between the second axial sealing sleeve and the second main body and is configured to press the second edge surface onto the second closure disc, and wherein the recess is arranged on a side of the second closure disc facing away from the second main body.

6. The coupling system according to claim 1, further comprising:

a sealing ring between the first closure disc and the first edge surface.

7. The coupling system according to claim 1, wherein the second axial sealing sleeve is arranged in an axially movable manner on the second main body and has at least one second through flow opening surrounded by a second edge surface on the second end-located boundary surface, wherein the second closure device has a second closure disc rigidly connected to the second main body and arranged on a side of the second edge surface facing away from the second main body, and wherein the second spring is arranged between the second axial sealing sleeve and the second main body and is configured to press the second edge surface onto the second closure disc.

8. The coupling system according to claim 7, further comprising:

a sealing ring between the second closure disc and the second edge surface.

9. The coupling system according to claim 8, wherein the second axial sealing sleeve is movably mounted in a guide sleeve, and wherein the guide sleeve is rigidly connected to the second main body.

10. The coupling system according to claim 9, wherein the guide sleeve has a depression configured to accommodate the second closure disc in a position deflected towards the second main body.

* * * * *